United States Patent
Fujishiro et al.

(10) Patent No.: US 10,667,252 B2
(45) Date of Patent: May 26, 2020

(54) RADIO TERMINAL

(71) Applicant: KYOCERA CORPORATION, Kyoto (JP)

(72) Inventors: Masato Fujishiro, Yokohama (JP);
Chiharu Yamazaki, Tokyo (JP);
Atsuhisa Inakoshi, Yokohama (JP);
Fangwei Tong, Machida (JP); Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/109,302

(22) Filed: Aug. 22, 2018

(65) Prior Publication Data

US 2019/0014565 A1    Jan. 10, 2019

Related U.S. Application Data

(63) Continuation of application No. PCT/JP2017/005320, filed on Feb. 14, 2017.

(30) Foreign Application Priority Data

Feb. 23, 2016  (JP) ................................ 2016-031996

(51) Int. Cl.
*H04W 72/04* (2009.01)
*H04W 8/22* (2009.01)
(Continued)

(52) U.S. Cl.
CPC .......... *H04W 72/042* (2013.01); *H04W 8/22* (2013.01); *H04W 72/04* (2013.01);
(Continued)

(58) Field of Classification Search
CPC .......... H04L 2012/5632; H04W 72/00; H04W 72/04; H04W 72/10
See application file for complete search history.

(56) References Cited

U.S. PATENT DOCUMENTS

| 6,333,936 B1 * | 12/2001 | Johansson | H04J 13/16 370/449 |
| 10,219,291 B2 * | 2/2019 | Pelletier | H04W 72/1289 |

(Continued)

FOREIGN PATENT DOCUMENTS

| WO | 2015/141824 A1 | 9/2015 |
| WO | 2015/170544 A1 | 11/2015 |

OTHER PUBLICATIONS

Samsung; "Utilization of multiple resource pools based on RSRP for type-1 discovery", 3GPP TSG WG1 Meeting #78bis; R1-143867; Ljubljana, Slovenia; Oct. 6-10, 2014; 4pp.
(Continued)

*Primary Examiner* — Ayaz R Sheikh
*Assistant Examiner* — Debebe A Asefa
(74) *Attorney, Agent, or Firm* — Studebaker & Brackett PC

(57) ABSTRACT

A radio terminal according to an embodiment is used in a mobile telecommunication system which provides a plurality of communication services. The radio terminal includes a controller which uses any of a plurality of resource pools provided for each communication service on the basis of resource map information. The plurality of resource pools is provided in one radio frame and in one system bandwidth. The resource map information indicates the layout pattern of the plurality of resource pools.

3 Claims, 9 Drawing Sheets

(51) Int. Cl.
*H04W 72/10* (2009.01)
*H04W 76/14* (2018.01)

(52) U.S. Cl.
CPC ........ *H04W 72/044* (2013.01); *H04W 72/048* (2013.01); *H04W 72/10* (2013.01); *H04W 76/14* (2018.02)

(56) References Cited

U.S. PATENT DOCUMENTS

2012/0129560 A1* 5/2012 Lunden ................ H04W 72/10
455/512
2017/0013634 A1 1/2017 Tsuboi et al.
2017/0142764 A1 5/2017 Yasukawa et al.

OTHER PUBLICATIONS

LG Electronics Inc, "Resource pool selection with group priority", 3GPP TSG-RAN WG2 #88, R2-145078, Nov. 17-21, 2014, 2 pages, San Francisco, USA.
InterDigital Communications, "Multiple Transmission Pools for ProSe Communications", 3GPP TSG-RAN WG2 #88, R2-145204, Nov. 17-21, 2014, 3 pages, San Francisco, USA.
Qualcomm Technologies Inc., "The 5G Unified Air Interface", Nov. 2015, pp. 1-46, Qualcomm Technologies Inc.

* cited by examiner

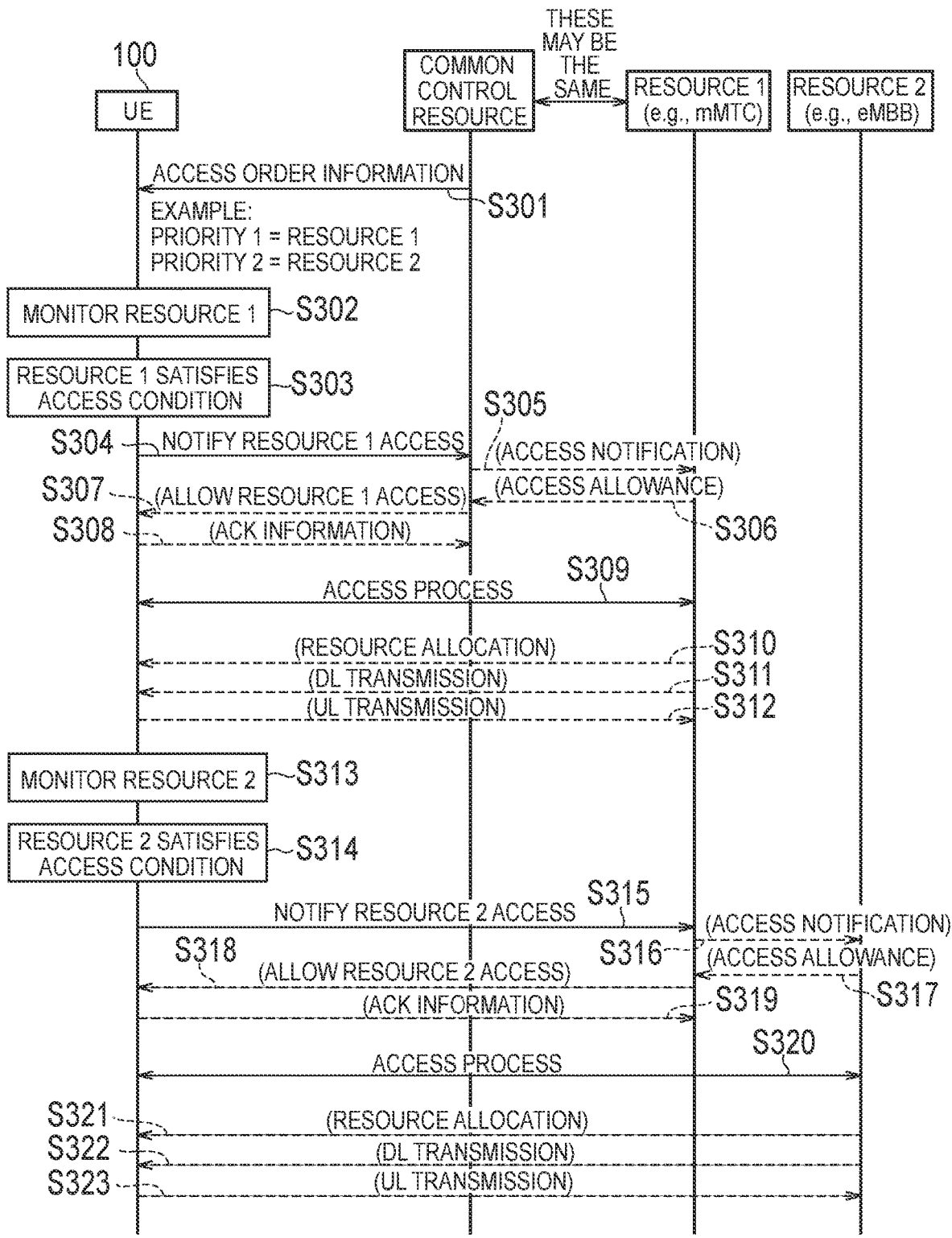

RADIO TERMINAL

RELATED APPLICATION

This application is a continuation application of international application PCT/JP2017/005320, filed Feb. 14, 2017, which claims the benefit of Japanese Patent Application No. 2016-031996 filed Feb. 23, 2016, the entire contents of which are incorporated herein by reference.

TECHNICAL FIELD

The present disclosure relates to a radio terminal which is used in a mobile telecommunication system.

BACKGROUND ART

In recent years, technologies for the 5th generation (5G) mobile telecommunication system have been studied. As one of such technologies, there is proposed a technology in which time/frequency resources in one radio frame and in one system bandwidth are allocated to a plurality of resource pools, and a plurality of communication services can be provided using the plurality of resource pools. The plurality of communication services includes new services for 5G systems. With the introduction of such a radio frame structure, various services can be provided using one radio frame format.

SUMMARY

A radio terminal according to an embodiment is used in a mobile telecommunication system providing a plurality of communication services. The radio terminal includes a controller configured to use any of a plurality of resource pools provided for each communication service on the basis of resource map information. The plurality of resource pools is provided in one radio frame and in one system bandwidth. The resource map information indicates a layout pattern of the plurality of resource pools.

A network apparatus according to an embodiment is used in a mobile telecommunication system providing a plurality of communication services. The network apparatus includes a controller which manages a plurality of resource pools provided for each communication service. The plurality of resource pools is provided in one radio frame and in one system bandwidth. The controller is configured to transmit resource map information indicating a layout pattern of the plurality of resource pools to a radio terminal.

A radio terminal according to an embodiment is used in a mobile telecommunication system providing a plurality of communication services. The radio terminal includes a controller configured to determine whether the radio terminal satisfies a use condition of a predetermined resource pool among a plurality of resource pools provided for each communication service. The plurality of resource pools is provided in one radio frame and in one system bandwidth. The use condition is a condition which the radio terminal should satisfy in order to use the predetermined resource pool.

A network apparatus according to an embodiment is used in a mobile telecommunication system providing a plurality of communication services. The network apparatus includes a controller which manages a plurality of resource pools provided for each communication service and a use condition of each of the plurality of resource pools. The plurality of resource pools is provided in one radio frame and in one system bandwidth. The use condition is a condition to be satisfied by a radio terminal to use a corresponding resource pool.

A radio terminal according to an embodiment is used in a mobile telecommunication system providing a plurality of communication services. The radio terminal includes a controller configured to use any of a plurality of resource pools provided for each communication service. The plurality of resource pools is provided in one radio frame and in one system bandwidth. The controller is configured to use a primary resource pool first among the plurality of resource pools.

A network apparatus according to an embodiment is used in a mobile telecommunication system providing a plurality of communication services. The network apparatus includes a controller which manages a plurality of resource pools provided for each communication service. The plurality of resource pools is provided in one radio frame and in one system bandwidth. The plurality of resource pools includes a primary resource pool which is first used by the radio terminal among the plurality of resource pools.

A radio terminal according to an embodiment is used in a mobile telecommunication system providing a plurality of communication services. The radio terminal includes a controller which uses any of a plurality of resource pools provided for each communication service. The plurality of resource pools is provided in one radio frame and in one system bandwidth. Each of the plurality of resource pools includes a cell identifier. The controller is configured to handle each of the plurality of resource pools as one cell.

A network apparatus according to an embodiment is used in a mobile telecommunication system providing a plurality of communication services. The network apparatus includes a controller which manages a plurality of resource pools provided for each communication service. The plurality of resource pools is provided in one radio frame and in one system bandwidth. Each of the plurality of resource pools includes a cell identifier. The controller is configured to handle each of the plurality of resource pools as one cell.

BRIEF DESCRIPTION OF DRAWINGS

FIG. 11 is a diagram illustrating an exemplary operation of a third embodiment.

DESCRIPTION OF EMBODIMENTS (Configuration of Mobile Telecommunication System)

Figure 1:
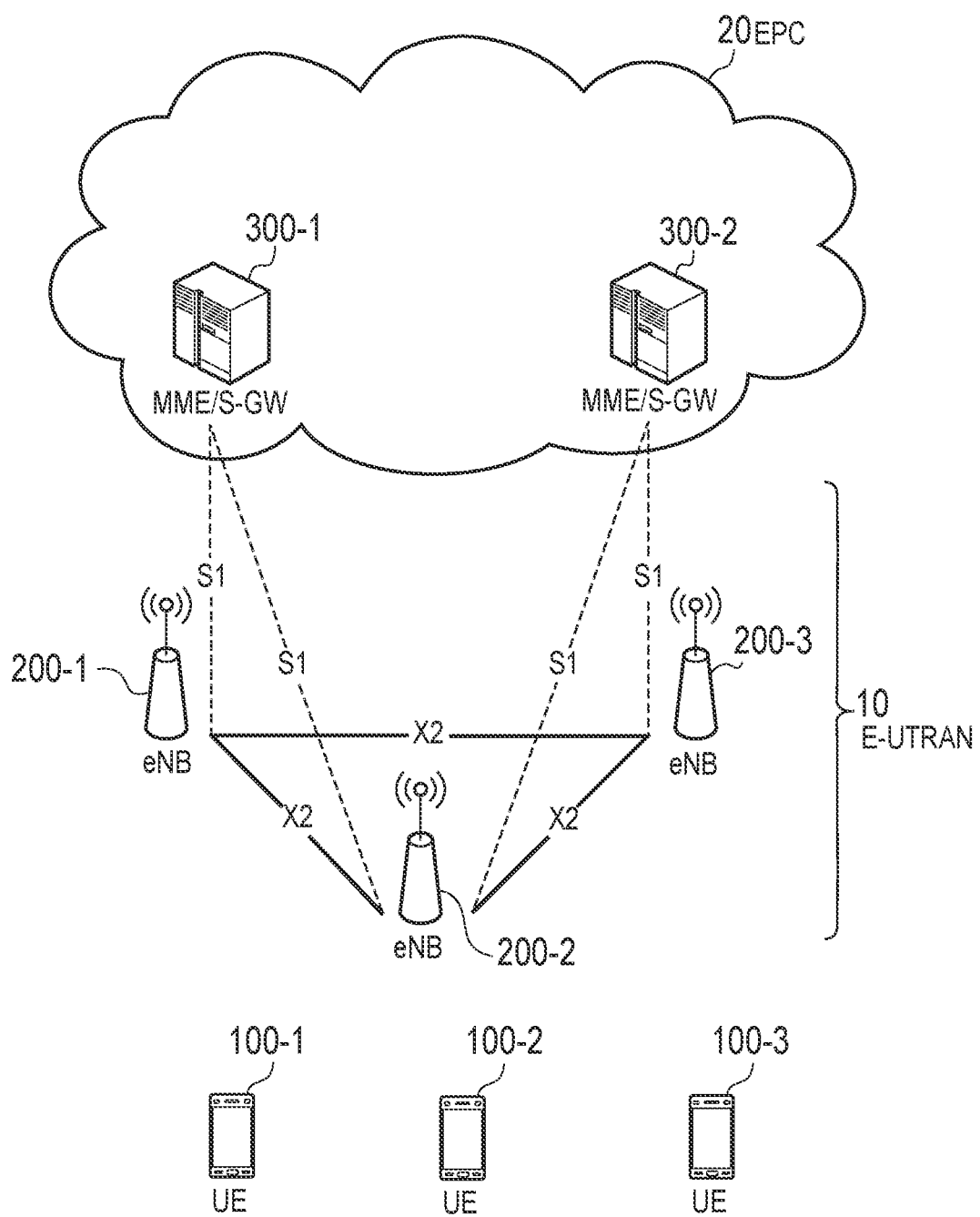
FIG. 1 is a diagram illustrating a configuration of a mobile telecommunication system.

In the following, a configuration of a mobile telecommunication system according to an embodiment will be described. FIG. 1 is a diagram illustrating a configuration of the mobile telecommunication system according to the embodiment. The mobile telecommunication system according to the embodiment is a mobile telecommunication system based on the 3GPP (3rd Generation Partnership Project).LTE (Long Term Evolution).

As illustrated in FIG. 1, the mobile telecommunication system according to the embodiment includes a UE (User Equipment) 100, an E-UTRAN (Evolved-UMTS Terrestrial Radio Access Network) 10, and an EPC (Evolved Packet Core) 20. The E-UTRAN 10 and the EPC 20 form a network of the LTE system.

The UE 100 corresponds to a radio terminal. The UE 100 is a mobile terminal, and performs a radio communication with a cell (serving cell). The configuration of the UE 100 will be described below.

The E-UTRAN 10 corresponds to a radio access network. The E-UTRAN 10 includes an eNB 200 (evolved Node-B). The eNB 200 corresponds to a base station. The eNBs 200 are connected to each other through an X2 interface. The configuration of the eNB 200 will be described below.

The eNB 200 manages one or a plurality of cells, and performs a radio communication with the UE 100 which has established the connection with a subject cell. The eNB 200 has a radio resource management (RRM) function, a routing function of user data (hereinafter, simply referred to as "data"), and a measurement control function for mobility control/scheduling. "Cell" is used as a terminology indicating a minimum unit of radio communication area, and also used as a terminology indicating a function of the radio communication with the UE 100.

The EPC 20 corresponds to a core network. The EPC 20 includes an MME (Mobility Management Entity)/S-GW (Serving-Gateway) 300. The MME performs various types of mobility controls on the UE 100. The S-GW performs data transmission control. The MME/S-GW 300 is connected to the eNB 200 through an S1 interface. The E-UTRAN 10 and the EPC 20 form a network.

Figure 2:
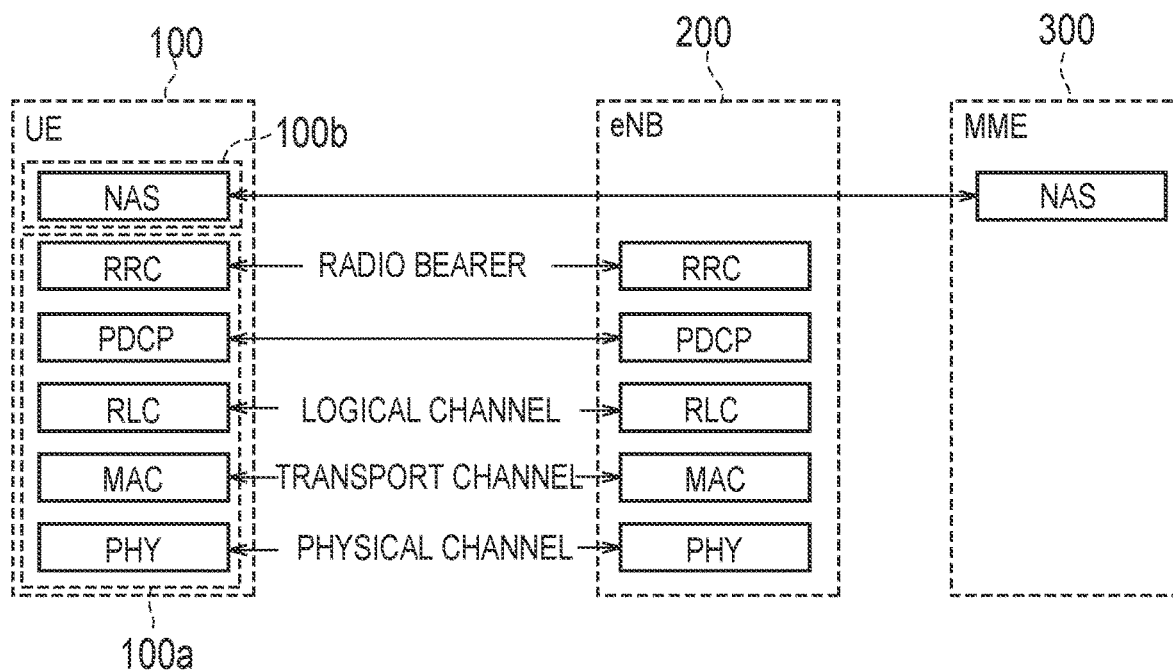
FIG. 2 is a diagram illustrating a protocol stack of a radio interface in the mobile telecommunication system.

FIG. 2 is a diagram illustrating a protocol stack of a radio interface in the mobile telecommunication system according to the embodiment. As illustrated in FIG. 2, the radio interface protocol is classified into the first to third layers of an OSI reference model. The first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control).

The physical layer, the MAC layer, the RLC layer, the PDCP layer, and the RRC layer form an AS (Access Stratum) entity 100a. An upper layer entity 100b is located at a layer upper than the AS entity 100a. The upper layer entity 100b includes a NAS (Non-Access Stratum) layer. The upper layer entity 100b may further include an application layer.

The physical layer performs encoding/decoding, modulation/demodulation, antenna mapping/demapping, and resource mapping/demapping. Data and control signals are transferred between the physical layer of the UE 100 and the physical layer of the eNB 200 through a physical channel.

The MAC layer performs a data priority control, a retransmission by a hybrid ARQ (HARQ), and a random access procedure. Data and control signals are transferred between the MAC layer of the UE 100 and the MAC layer of the eNB 200 through a transport channel. The MAC layer of the eNB 200 includes a scheduler which determines a transport format of uplink and downlink (transport block size, modulation and coding scheme (MCS)) and a subject resource block for the UE 100.

The RLC layer transfers data to the RLC layer on a reception side using the functions of the MAC layer and the physical layer. Data and control signals are transferred between the RLC layer of the UE 100 and the RLC layer of the eNB 200 through a logical channel.

The PDCP layer performs header compression/extension and encryption/decryption.

The RRC layer is only defined by a control plane to handle the control signals. Signals (RRC signals) for various types of settings are transferred between the RRC layer of the UE 100 and the RRC layer of the eNB 200. The RRC layer controls the logical channel, the transport channel, and the physical channel according to establishment, reestablishment, and release of a radio bearer. In a case where the RRC layer of the UE 100 and the RRC layer of the eNB 200 are connected (RRC connection), the UE 100 is in an RRC connected mode and, if not, the UE 100 is in an RRC idle mode.

The NAS layer located upper than the RRC layer performs a session management and a mobility management.

Figure 3:
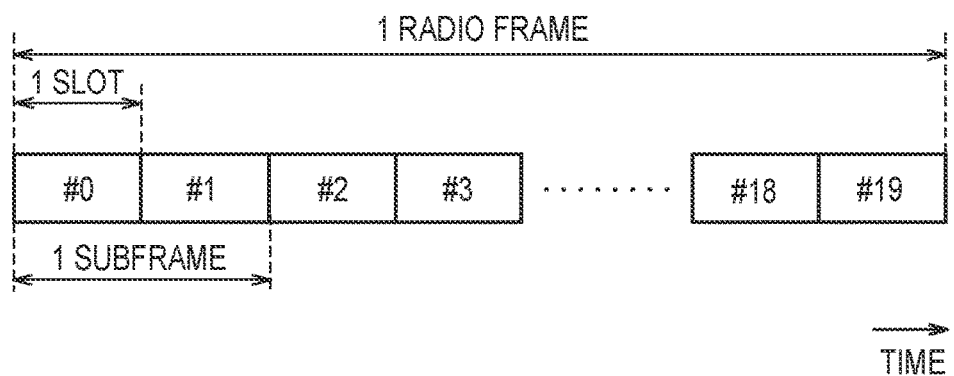
FIG. 3 is a diagram illustrating a configuration of a radio frame which is used in the mobile telecommunication system.

FIG. 3 is a diagram illustrating a configuration of a radio frame which is used in the mobile telecommunication system according to the embodiment.

As illustrated in FIG. 3, the radio frame is configured by ten sub-frames which are aligned in a time direction. Each sub-frame is configured by two slots which are aligned in the time direction. The length of each sub-frame is 1 ms, and the length of each slot is 0.5 ms. Each sub-frame includes a plurality of resource blocks (RB) in a frequency direction, and includes a plurality of symbols in the time direction. Each resource block includes a plurality of subcarriers in the frequency direction. One symbols and one subcarrier form one resource element (RE). In addition, a frequency resource among time/frequency resources allocated to the UE 100 can be specified by a resource block, and a time resource can be specified by a sub-frame (or slot).

Figure 4:
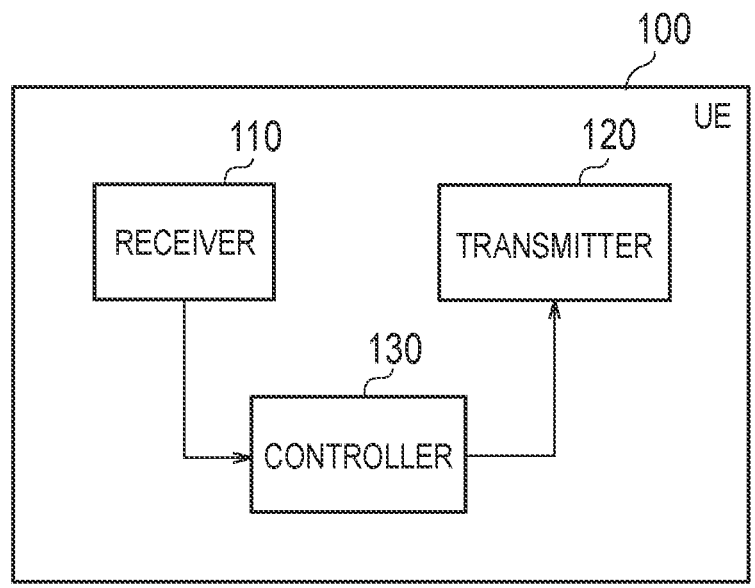
FIG. 4 is a diagram illustrating a configuration of a UE (radio terminal).

FIG. 4 is a diagram illustrating a configuration of the UE 100 (radio terminal). As illustrated in FIG. 4, the UE 100 includes a receiver 110, a transmitter 120, and a controller 130.

The receiver 110 performs various types of reception under the control of the controller 130. The receiver 110 includes an antenna and a receiving module. The receiving module converts a radio signal received by the antenna into a base band signal (reception signal), and outputs the base band signal to the controller 130.

The transmitter 120 performs various types of transmission under the control of the controller 130. The transmitter 120 includes an antenna and a transmitting module. The transmitting module converts a base band signal (transmission signal) output by the controller 130 into a radio signal, and outputs the radio signal from the antenna.

The controller 130 performs various types of controls in the UE 100. The controller 130 includes a processor and a memory. The memory stores programs executed by the processor and information used in processes of the processor. The processor includes a base band processor which performs modulation/demodulation and encoding/decoding of the base band signal, and a CPU (Central Processing Unit) which executes a program stored in the memory to perform various types of processes. The processor may include a codec which performs encoding/decoding of an audio/video signal. The processor performs various types of processes described above and various types of processes described below.

Figure 5:
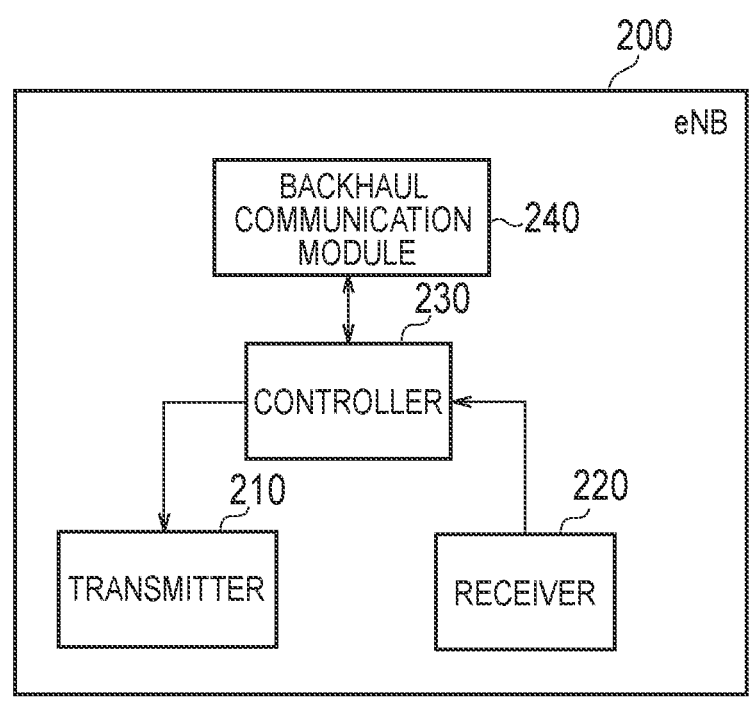
FIG. 5 is a diagram illustrating a configuration of an eNB (base station).

FIG. 5 is a diagram illustrating a configuration of the eNB 200 (base station). As illustrated in FIG. 5, the eNB 200 includes a transmitter 210, a receiver 220, a controller 230, and a backhaul communication module 240.

The transmitter 210 performs various types of transmission under the control of the controller 230. The transmitter 210 includes an antenna and a transmitting module. The transmitting module converts a base band signal (transmission signal) output by the controller 230 into a radio signal, and transmits the radio signal from the antenna.

The receiver 220 performs various types of reception under the control of the controller 230. The receiver 220 includes an antenna and a receiving module. The receiving module converts a radio signal received by the antenna into a base band signal (reception signal), and outputs the base band signal to the controller 230.

The controller 230 performs various types of controls in the eNB 200. The controller 230 includes a processor and a memory. The memory stores programs executed by the processor and information used in processes of the processor. The processor includes a base band processor which performs modulation/demodulation and encoding/decoding of the base band signal, and a CPU (Central Processing Unit) which executes a program stored in the memory to perform various types of processes. The processor performs various types of processes described above and various types of processes described below.

The backhaul communication module 240 is connected to the adjacent eNB 200 through the X2 interface, and connected to the MME/S-GW 300 through the S1 interface. The backhaul communication module 240 is used in communication performed on the X2 interface and in communication performed on the S1 interface.

(Radio Frame Structure)

Figure 6:
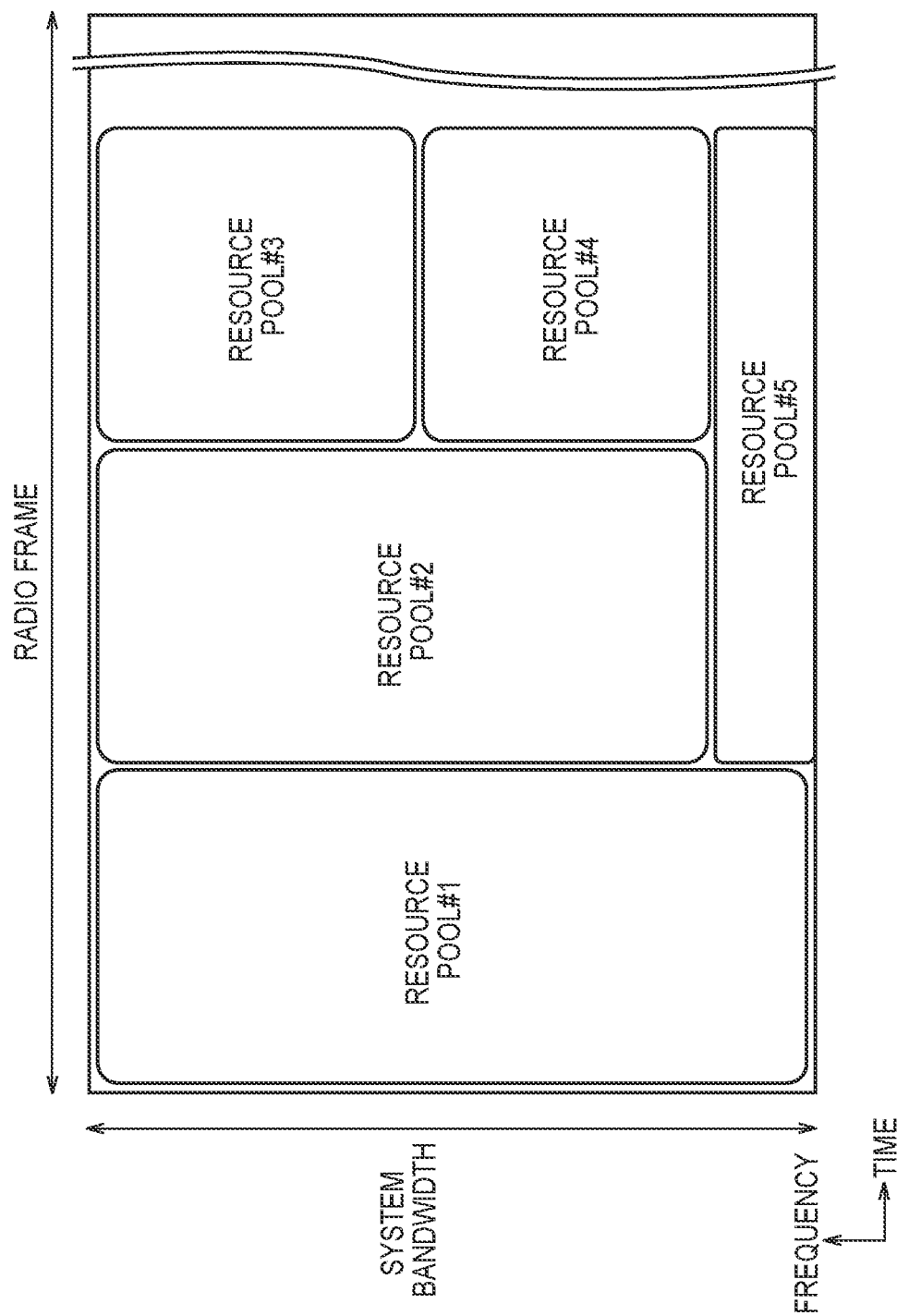
FIG. 6 is a diagram illustrating an example of a radio frame structure according to an embodiment.

In the following, a radio frame structure according to the embodiment will be described. FIG. 6 is a diagram illustrating an example of the radio frame structure according to the embodiment.

As illustrated in FIG. 6, a plurality of resource pools is provided in one radio frame and in one system bandwidth. Each resource pool includes a plurality of time/frequency resources. For example, each resource pool is configured by a plurality of subcarriers and a plurality of OFDM symbols.

Further, the plurality of resource pools may be set in "period" or "time unit" in the time direction which are not limited to the radio frame unit. In addition, a duration of a sub-frame included in one radio frame may be fixed or varied. Further, the number of sub-frames included in one radio frame may be fixed or varied. In a case where the duration of a sub-frame and the number thereof is variable, these parameters are notified to the UE 100 by "specific resource pool" and/or "primary resource (primary resource pool)" described below.

The plurality of resource pools is provided according to a communication service. The communication service (hereinafter, simply referred to as "service") includes a communication service which is currently provided by the mobile telecommunication system and a communication service which is scheduled to be provided by the mobile telecommunication system.

For example, the communication service includes existing services such as a WAN (Wide Area Network) communication service, a D2D (Device-to-Device) proximity service, a multicast service, a machine type communication (MTC) service, and an enhanced mobile broadband (eMBB) service. A resource pool which is currently not provided by the mobile telecommunication system and corresponds to a scheduled communication service may be handled as a currently-not-used resource (blank resource). The blank resource may be called a blank sub-frame, or may be called a blank subcarrier.

In addition, signal parameters applied to the respective resource pools may differ. For example, a subcarrier spacing (SS) and a TTI (Transmission Time Interval) in signal transmission based on the OFDM may be scalable (variable).

Figure 7:
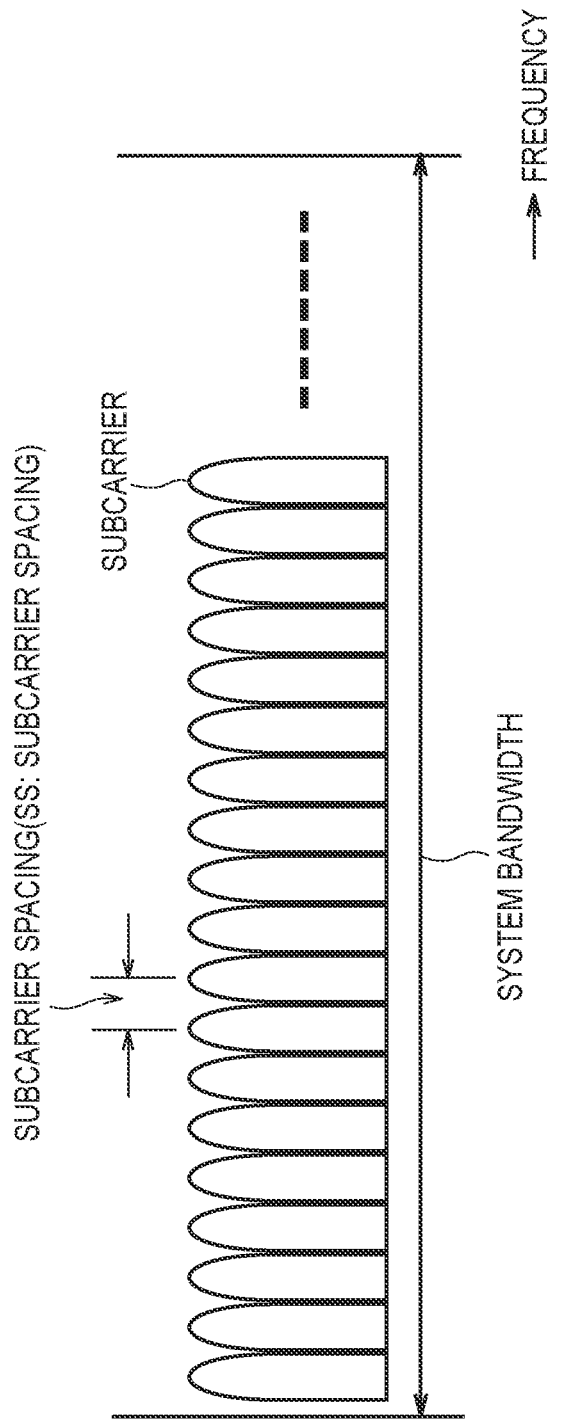
FIG. 7 is a diagram illustrating an OFDM signal waveform.

FIG. 7 is a diagram illustrating an OFDM signal waveform. As illustrated in FIG. 7, the OFDM transmission is a type of multi-carrier modulation scheme in which data is distributed to a plurality of orthogonal subcarriers and transmitted in parallel in the frequency direction. The subcarrier spacing indicates an interval between two adjacent subcarriers. When the subcarrier spacing is widened, the length of the OFDM symbol becomes short. In other words, the TTI can be shortened.

In this way, if the radio frame structure is introduced to provide a plurality of communication services using the plurality of resource pools, it is possible to provide various services in one radio frame format.

First Embodiment

In the following, a first embodiment will be described. The following embodiments are implemented on an assumption of the mobile telecommunication system to which the radio frame structure as illustrated in FIG. 6 is introduced.

Figure 8:
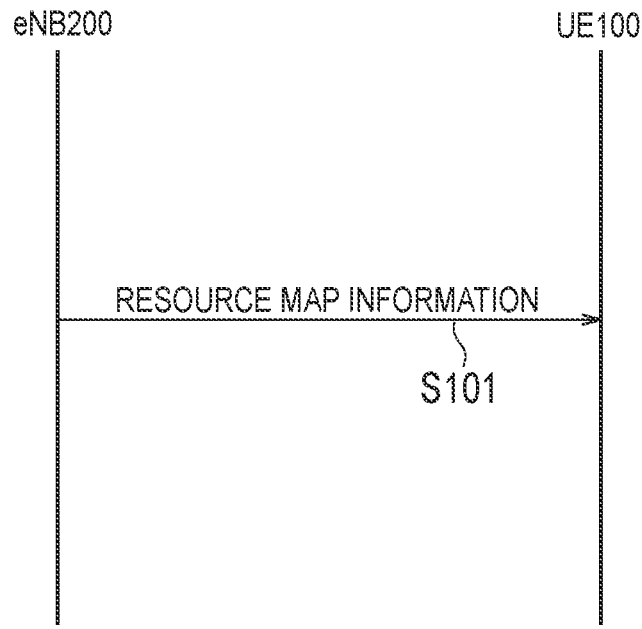
FIG. 8 is a diagram illustrating an operation according to a first embodiment.

FIG. 8 is a diagram illustrating an operation according to the first embodiment. As illustrated in FIG. 8, a network apparatus (the eNB 200) which manages the plurality of resource pools provided for each communication service transmits resource map information to the UE 100 in Step S101. The resource map information indicates a layout pattern of the plurality of resource pools. The UE 100 receives the resource map information. The UE 100 uses any one of the plurality of resource pools on the basis of the resource map information.

In the following embodiments, the description will be given about an example that the network apparatus is the eNB 200 in a radio access network (the E-UTRAN 10). However, the network apparatus may be a network entity in the core network (the EPC 20).

The eNB 200 may transmit the resource map information by broadcast signaling. Alternatively, the eNB 200 may transmit the resource map information by UE dedicated signaling. In a case where the UE dedicated signaling is used, the eNB 200 may transmit the resource map information to a specific UE 100 in response to a request from the specific UE 100.

In the first embodiment, the eNB 200 transmits the resource map information using the specific resource pool. The specific resource pool is a resource pool to which a base TTI is applied. The base TTI is a TTI of the existing LTE system. The base TTI may be a TTI which is defined as a default value (or an initial value). The resource pools other than the specific resource pool may be applied with a TTI shorter than the base TTI (that is, a TTI for 5G system). The specific resource pool may be a common control resource or a primary resource which is described in a third embodiment.

Further, the specific resource pool may have at least one of the following characteristics.

The specific resource pool is disposed in a specific time/frequency resource in the above-described one radio frame (or one period).

In order to adaptively control the time/frequency resource of the specific resource pool, control information indicating a resource in the specific resource pool is disposed in a specific time/frequency resource in one radio frame (or one period).

At least one synchronization signal is included in one specific resource pool.

In addition, the resource map information may indicate a resource pool layout pattern in one radio resource, or may indicate a resource pool layout pattern over a plurality of radio resources.

The resource map information may also include a plurality of entries corresponding to the plurality of resource pools. Each entry may include information indicating an identifier of the resource pool, an identifier of a service provided by the subject resource pool, and a layout of the subject resource pool (that is, time position and frequency position). The identifier of the resource pool may be a cell identifier to be described in a fourth embodiment. The information indicating the layout of the resource pool may include sub-frame information and resource block information, or may be a pattern identifier to identify any of the plurality of pre-defined layout patterns. In addition, each entry may include information indicating a signal parameter (for example, the subcarrier spacing, the TTI, etc.) which is applied to the subject resource pool.

The UE 100 receives the resource map information. The UE 100 ascertains the layout (that is, a time range and a frequency range) of each resource pool on the basis of the resource map information. Then, the UE 100 starts to use the resource pool corresponding to a desired service. The UE 100 may use only one resource pool, and transmit/receive data using one resource pool. Alternatively, the UE 100 may use the plurality of resource pools at the same time, and transmit/receive data using the plurality of resource pools. For example, the UE 100 may transmit/receive the data of a first bearer of the subject UE 100 using Resource Pool #1, and transmit/receive the data of a second bearer of the subject UE 100 using Resource Pool #2.

The UE 100 may issue a notification to the eNB 200 before starting to use a desired resource pool. The eNB 200 may allocate the time/frequency resource in a desired resource pool to the UE 100 according to the notification from the UE 100. The eNB 200 may transmit allocation information to the UE 100 using a control resource made of a specific time/frequency resource in a desired resource pool.

The first embodiment may be summarized as follows.

The network apparatus (the eNB 200) according to the first embodiment is used in the mobile telecommunication system which provides the plurality of communication services. The network apparatus includes the controller 230 which manages the plurality of resource pools provided for each communication service. The plurality of resource pools is provided in one radio frame and in one system bandwidth. The controller transmits the resource map information indicating the layout pattern of the plurality of resource pools to a radio terminal. The controller may transmit the resource map information using a specific resource pool. In the specific resource pool, the base TTI (Transmission Time Interval) is applied.

The radio terminal (the UE 100) according to the first embodiment is used in the mobile telecommunication system which provides the plurality of communication services. The radio terminal includes the controller 130 which uses any of the plurality of resource pools provided for each communication service on the basis of the resource map information. The plurality of resource pools is provided in one radio frame and in one system bandwidth. The resource map information indicates the layout pattern of the plurality of resource pools.

Therefore, according to the first embodiment, the UE 100 can ascertain the layout of each resource pool to appropriately use a desired resource pool.

First Modification of First Embodiment

In the first embodiment, the description has been given about an example in which the eNB 200 allocates the resources in each resource pool. However, the resource allocation in at least one resource pool may be performed by the UE 100. For example, the resource allocation in the resource pool for the D2D proximity service may be performed by the UE 100.

In this case, each entry of the resource map information may include information indicating whether the resource allocation to the corresponding resource pool is performed by the eNB 200 or the UE 100.

Second Modification of First Embodiment

The UE 100 may store the pre-defined resource map information. In this case, the network (the eNB 200 or another network entity) may not provide the resource map information to the UE 100. Alternatively, in a case where the resource pool layout pattern is updated, the network may provide the resource map information to the UE 100. In addition, the network may update the resource pool layout pattern on the basis of a use situation of each resource pool.

Second Embodiment

In the following, a second embodiment will be described mainly focusing on differences from the first embodiment.

The eNB 200 according to the second embodiment manages the plurality of resource pools provided for each communication service and a use condition of each of the plurality of resource pools. The use condition is a condition which the UE 100 satisfies in order to use the corresponding resource pool. The use condition may be called "access condition".

In a first exemplary operation of the second embodiment, the UE 100 determines whether the use condition is satisfied. With this regard, the eNB 200 determines whether the use condition is satisfied in a second exemplary operation of the second embodiment.

(1) First Exemplary Operation

Figure 9:
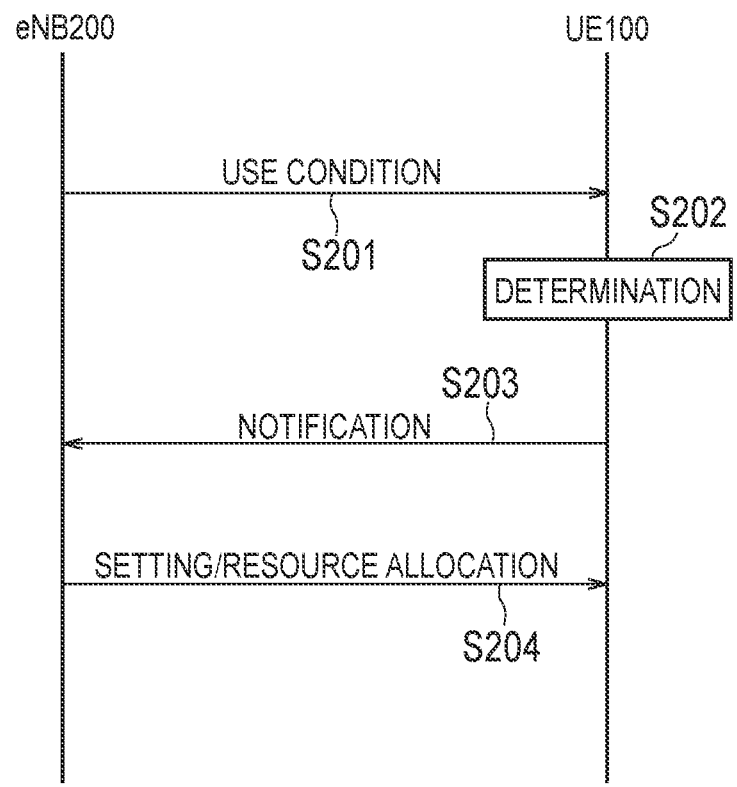
FIG. 9 is a diagram illustrating a first exemplary operation of a second embodiment.

FIG. 9 is a diagram illustrating the first exemplary operation of the second embodiment.

As illustrated in FIG. 9, in Step S201, the eNB 200 transmits information indicating the use condition of the resource pool (hereinafter, referred to as "use condition information") to the UE 100. The use condition information may be included in the resource map information according to the first embodiment. The eNB 200 transmits the use condition information by the broadcast signaling or the UE dedicated signaling. In a case where the UE dedicated signaling is used, the eNB 200 may transmit the resource map information to the UE 100 in response to a request from the UE 100.

The use condition information may include the use condition of each of the plurality of resource pools. For example, the use condition information includes a plurality of entries corresponding to the plurality of resource pools. Each entry may include the identifier of the resource pool, and the use condition of the subject resource pool.

Alternatively, the use condition information may include the use condition of only one resource pool. For example, in a case where the UE 100 requests a transmission of the use condition of one resource pool, the eNB 200 notifies the UE 100 of the use condition of the subject one resource pool by the UE dedicated signaling.

The use condition includes at least one of a threshold (radio parameter threshold) which is compared to a radio parameter measured by the UE 100, a threshold (random number threshold) which is compared to a random number generated by the UE 100, a class (access class) or a category of the UE 100, a range of an identifier of the UE 100, a type of an application which is performed by the UE 100, and a type of a protocol which is performed by the UE 100.

Herein, the radio parameter is, for example, at least one of RSRP (Reference Signal Received Power), RSRQ (Reference Signal Received Quality), SINR (Signal-to-Interference plus Noise power Ratio), and RSSI (Received Signal Strength Indicator). In addition, the identifier of the UE 100 may be IMSI (International Mobile Subscriber Identity) for example. The type of an application which is performed by the UE 100 is, for example, delay allowance data communication, high-speed data communication, VoLTE (Voice over LTE), emergency call, public safety, D2D, V2X, D2D relay, and signaling (control signal). The type of a protocol which is performed by the UE 100 is SIP (Session Initiation Protocol) and FTP (File Transfer Protocol). The AS entity 100*a* of the UE 100 ascertains the type of an application and the type of a protocol on the basis of a content instructed from the upper layer entity 100*b*.

In Step S202, the UE 100 determines whether the UE 100 satisfies the use condition of a predetermined resource pool on the basis of the use condition information received from the eNB 200. The predetermined resource pool may be all of the plurality of resource pools, or may be only resource pools which are desired to be used by the UE 100 among the plurality of resource pools.

It is assumed that the radio parameter threshold is designated as the use condition of the predetermined resource pool. In this case, the UE 100 measures the radio parameter in the predetermined resource pool, and determines whether the measured radio parameter is better than the radio parameter threshold. In a case where the measured radio parameter is better, the UE 100 determines that the use condition of the predetermined resource pool is satisfied.

Herein, the random number threshold is assumed to be designated as the use condition of the predetermined resource pool. In this case, the UE 100 generates a random number, and compares the random number with the random number threshold. For example, in a case where the generated random number is equal to or more than the random number threshold, the UE 100 determines that the use condition of the predetermined resource pool is satisfied.

In addition, the access class or the category of the UE 100 is assumed to be designated as the use condition of the predetermined resource pool. In this case, the UE 100 reads out its own access class or category, and compares the access class or category with the designated access class or category. In a case where the values are matched, the UE 100 determines that the use condition of the predetermined resource pool is satisfied.

In addition, the range of the identifier of the UE 100 is assumed to be designated as the use condition of the predetermined resource pool. In this case, the UE 100 reads out its own identifier, and compares the own identifier with the range of the designated identifier. In a case where the own identifier falls within the range of the designated identifier, the UE 100 determines that the use condition of the predetermined resource pool is satisfied.

In addition, the type of an application or protocol which is performed by the UE 100 is assumed to be designated as the use condition of the predetermined resource pool. In this case, the UE 100 ascertains the type of an application or protocol which is performed by itself, and compares the ascertained type of the application or protocol with the designated type of the application or protocol. In a case where the values are matched, the UE 100 determines that the use condition of the predetermined resource pool is satisfied.

Further, in a case where a combination of plural use conditions is designated, the UE 100 may determine whether the designated combination is satisfied.

Here, the description will proceed on an assumption that the UE 100 determines that the use condition of the predetermined resource pool is satisfied.

In Step S203, the UE 100 transmits information to the eNB 200 which indicates a determination result of whether the use condition is satisfied. Specifically, the UE 100 transmits a notification to the eNB 200 which indicates that the use condition is satisfied. The notification may include the identifier of the resource pool and a value (index) indicating that the use condition of the subject resource pool is satisfied. Alternatively, the subject information may a connection request to the resource pool which satisfies the use condition.

In Step S204, the eNB 200 transmits configuration information and/or resource allocation information of the resource pool which satisfies the use condition to the UE 100. The UE 100 starts to use the subject resource pool on the basis of the configuration information and/or the resource allocation information.

(2) Second Exemplary Operation

Figure 10:
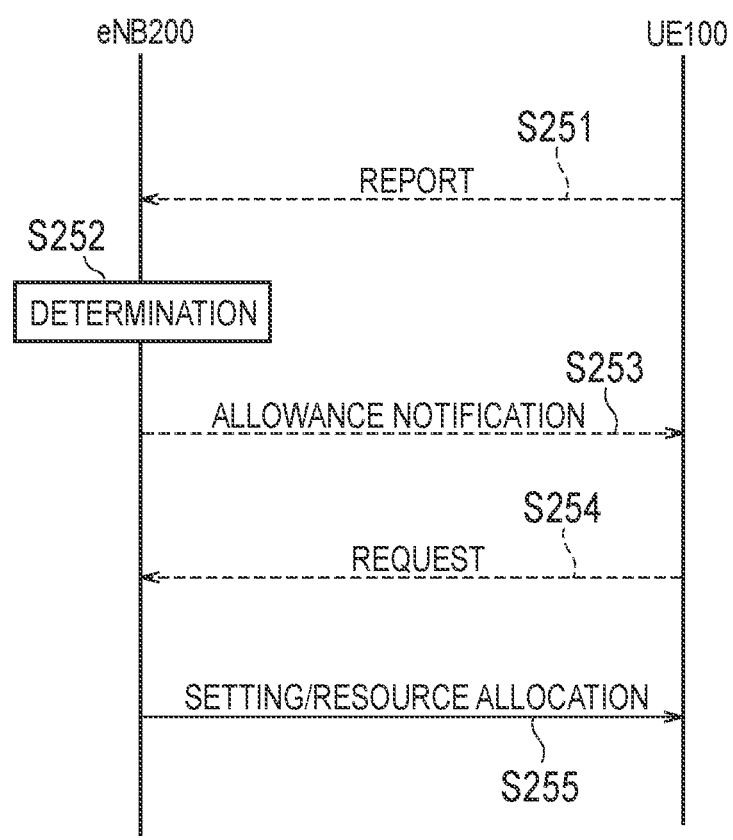
FIG. 10 is a diagram illustrating a second exemplary operation of the second embodiment.

FIG. 10 is a diagram illustrating the second exemplary operation of the second embodiment. In FIG. 10, the signaling depicted with a broken line illustrates an optional signaling.

As illustrated in FIG. 10, in Step S251, the UE 100 transmits, to the eNB 200, a report containing at least one of the radio parameter measured by the UE 100, the random number generated by the UE 100, the access class or category of the UE 100, the identifier of the UE 100, the type of an application performed by the UE 100, and the type of a protocol performed by the UE 100. The subject report may be a report for each bearer, or may be a report for each UE.

In Step S252, the eNB 200 determines whether the UE 100 satisfies the use condition of the predetermined resource pool on the basis of the report received from the UE 100. The determination method is similar to the first exemplary operation except that the determination is made by the eNB 200. However, the eNB 200 may make a determination on the basis of information other than the report of the UE 100. For example, the eNB 200 may manage a time zone as a use condition of the resource pool. In a case where the current time zone is available to the subject resource pool, the eNB 200 may determine that the use condition of the subject resource pool is satisfied. Alternatively, the eNB 200 may manage a load threshold as a use condition of the resource pool. In a case where the current load (resource use rate etc.) of the subject resource pool is less than the load threshold, the eNB 200 may determine that the use condition of the subject resource pool is satisfied. Further, the eNB 200 may determine whether a combination of plural use conditions is satisfied. Here, the description will proceed on an assumption that the eNB 200 determines that the use condition of the predetermined resource pool is satisfied.

In Step S253, the eNB 200 transmits information to the UE 100 which indicates a determination result of whether the use condition is satisfied. Specifically, the eNB 200 transmits a notification to the UE 100 which indicates that the use condition is satisfied using the UE dedicated signaling (or the broadcast signaling). The notification may include the identifier of the resource pool and a value (index) indicating that the use condition of the subject resource pool is satisfied.

In Step S254, the UE 100 transmits request information to the eNB 200 to request the use of the resource pool which satisfies the use condition. The notification may include the identifier of the resource pool and a value (index) indicating that the use of the subject resource pool is requested.

In Step S255, the eNB 200 transmits, to the UE 100, the configuration information and/or the resource allocation information of the resource pool (or the resource pool requested from the UE 100) which satisfies the use condition. The UE 100 starts to use the subject resource pool on the basis of the configuration information and/or the resource allocation information.

Further, Steps S253 and S254 may be omitted. In this case, the setting in Step S255 can implicitly be a determination result indicating that the use condition is satisfied.

(3) Summary of Second Embodiment

The second embodiment may be summarized as follows.

The network apparatus (the eNB 200) according to the second embodiment is used in the mobile telecommunication system which provides the plurality of communication services. The network apparatus includes the controller 230 which manages a plurality of resource pools provided for each communication service and the use condition of each of plurality of resource pools. The plurality of resource pools is provided in one radio frame and in one system bandwidth. The use condition is a condition that the radio terminal should satisfy in order to use the corresponding resource pool.

In the first exemplary operation of the second embodiment, the controller transmits the information indicating the use condition to the radio terminal, and receives the information indicating the determination result of whether the use condition is satisfied from the radio terminal.

In the second exemplary operation of the second embodiment, the controller determines whether the radio terminal satisfies the use condition, and notifies the information indicating the determination result to the radio terminal.

The radio terminal (the UE 100) according to the first exemplary operation of the second embodiment is used in the mobile telecommunication system which provides the plurality of communication services. The radio terminal includes the controller 130 which determines whether the radio terminal satisfies the use condition of the predetermined resource pool among the plurality of resource pools provided for each communication service. The plurality of resource pools is provided in one radio frame and in one system bandwidth. The use condition is a condition that the radio terminal should satisfy in order to use the predetermined resource pool.

Third Embodiment

In the following, a third embodiment will be described mainly focusing on differences from the first and second embodiments.

In the third embodiment, the plurality of resource pools includes a primary resource pool which is first used by the UE 100 among the plurality of resource pools. The UE 100 uses the primary resource pool first among the plurality of resource pools. Then, after starting the use of the primary resource pool, the UE 100 uses a resource pool other than the primary resource pool. The eNB 200 may transmits, to the UE 100, information causing the UE 100 to use a resource pool other than the primary resource pool after the UE 100 starts to use the primary resource pool.

In the third embodiment, the eNB 200 may transmit, to the UE 100, information indicating the primary resource pool and/or information indicating a priority of the plurality of resource pools. These pieces of information may be included in the resource map information according to the first embodiment. The eNB 200 transmits these pieces of information using the broadcast signaling or the UE dedicated signaling. Alternatively, the priorities of the primary resource pool and/or the plurality of resource pools may be defined in advance, and the UE 100 may store information indicating the primary resource pool and/or information indicating the priority of the plurality of resource pools in advance.

The primary resource pool is a resource pool for a machine type communication (MTC) service for example. In the MTC, it is assumed that a large number of UEs 100 are contained. Therefore, it is considered that a technology which can contain a large number of UEs 100 is employed. In addition, since a power saving technology is considered in the MTC, the MTC is suitable to the UE 100 which has no data or less. Therefore, a resource pool for the MTC is set as the primary resource pool, and other resource pools are used when a high data rate is required. With this configuration, the plurality of resource pools and/or the power (battery) of the UE 100 can be efficiently used.

FIG. 11 is a diagram illustrating an exemplary operation of the third embodiment. In FIG. 11, there is described an example in which a resource pool commonly used in the control of the plurality of resource pools (hereinafter, referred to as "common control resource") is provided.

In addition, the description will be given about an example in which the plurality of resource pools includes a resource pool for an mMTC (massive MTC) (hereinafter, referred to as "Resource 1"), and a resource pool for an eMBB (hereinafter, referred to as "Resource 2"). The common control resource may be provided in a frequency band (different carrier) different from those of Resources 1 and 2. Alternatively, the common control resource may be provided in the same frequency band (same carrier) as those of Resources 1 and 2. In this case, the common control resource may be the same as Resource 1.

In addition, in FIG. 11, it is assumed that the common control resource, Resource 1, and Resource 2 are managed by the same eNB 200. However, the common control resource, Resource 1, and Resource 2 may be managed separately by a plurality of eNBs 200.

Further, in FIG. 11, the third embodiment will be described as an example in conjunction with the second embodiment. In addition, here, starting the use of the resource pool will be referred as "accessing the resource". Therefore, the use condition of the resource pool will be referred to as "access condition". Further, in FIG. 11, the signaling depicted with a broken line is an optional signaling.

As illustrated in FIG. 11, in Step S301, the eNB 200 transmits, to the UE 100, information indicating the primary resource pool and/or information (access order information) indicating the priority of the plurality of resource pools using the common control resource. For example, the eNB 200 transmits, to the UE 100, the access order information indicating that Resource 1 is accessed first and then Resource 2 is accessed. In other words, Resource 1 corresponds to the primary resource pool. Further, the eNB 200 may transmit information indicating the carriers of Resources 1 and 2, for example, ARFCN (Absolute Radio-Frequency Channel Number).

In Step S302, the UE 100 monitors Resource 1 on the basis of the access order information. Specifically, the UE 100 determines whether the access condition of Resource 1 is satisfied. Here, the description will proceed on an assumption that the access condition of Resource 1 is satisfied (Step S303).

In Step S304, the UE 100 transmits a notification (access notification) to the eNB 200 which indicates that the access condition of Resource 1 is satisfied using the common control resource.

In Steps S305 and S306, the eNB 200 checks whether the access to Resource 1 is allowable in response to the access notification. In a case where the common control resource and Resource 1 are managed by the different eNBs 200, the eNB 200 managing the common control resource and the eNB 200 managing Resource 1 may perform negotiation. Here, the description will proceed on an assumption that the access to Resource 1 is allowed.

In Step S307, the eNB 200 notifies the access allowance of Resource 1 to the UE 100 using the common control resource. The UE 100 may notify ACK information with respect to the access allowance of Resource 1 to the eNB 200 using the common control resource (Step S308). The ACK information may be considered as a notification indicating that the access process (RACH, connection request, etc.) to Resource 1 starts. Therefore, the ACK information can be used as a trigger to start the reception process in Resource 1.

In Step S309, the UE 100 performs an access process on Resource 1. The access process includes at least one of a synchronization process, a radio link process, and a security process. In other words, the access process includes at least one of a process corresponding to RACH procedure, a process corresponding to RRC Connection Establishment, a process of setting security of the upper layer, and a process corresponding to RRC Connection Reconfiguration.

In Step S310, the eNB 200 allocates the resource in Resource 1. The eNB 200 transmits the resource allocation information to the UE 100 using Resource 1.

In Step S311, the eNB 200 transmits downlink (DL) data to the UE 100 using the resource allocated to the UE 100. In addition, in Step S312, the UE 100 transmits uplink (UL) data to the eNB 200 using the resource allocated from the eNB 200. The order of Steps S311 and S312 may be reversed.

In Step S313, the UE 100 monitors Resource 2 on the basis of the access order information. Specifically, the UE 100 determines whether the access condition of Resource 2 is satisfied. Here, the description will proceed on an assumption that the access condition of Resource 2 is satisfied (Step S314).

In Step S315, the UE 100 transmits a notification (access notification) to the eNB 200 which indicates that the access condition of Resource 2 is satisfied using Resource 1.

In Steps S316 and S317, the eNB 200 checks whether the access to Resource 2 is allowable in response to the access notification. In a case where Resources 1 and 2 are managed by the different eNBs 200, the eNB 200 managing Resource 1 and the eNB 200 managing Resource 2 may perform negotiation. Here, the description will proceed on an assumption that the access to Resource 2 is allowed.

In Step S318, the eNB 200 notifies the access allowance of Resource 2 to the UE 100 using Resource 1. The UE 100 may notify the ACK information with respect to the access allowance of Resource 1 to the eNB 200 using Resource 1 (Step S319). The ACK information may be considered as a notification indicating that the access process to Resource 2 starts. Therefore, the ACK information may be used as a trigger to start the reception process in Resource 2.

In Step S320, the UE 100 performs the access process on Resource 2.

In Step S321, the eNB 200 allocates the resource in Resource 2. The eNB 200 transmits the resource allocation information to the UE 100 using Resource 2.

In Step S322, the eNB 200 transmits the downlink (DL) data to the UE 100 using the resource allocated to the UE 100. In addition, in Step S323, the UE 100 transmits the uplink (UL) data to the eNB 200 using the resource allocated from the eNB 200. The order of Steps S322 and S323 may be reversed.

Thereafter, the UE 100 keeps on monitoring Resource 2, and may keep on determining whether the access condition of Resource 2 is satisfied. In a case where the access condition of Resource 2 is not satisfied, the UE 100 may notify the fact to the eNB 200. The eNB 200 may notify a change from Resource 2 to Resource 1 to the UE 100 in response to the notification. Alternatively, in a case where the access condition of Resource 2 is not satisfied, the UE 100 may determine the change from Resource 2 to Resource 1, and may transmit the signal (and/or data) using Resource 1. In a case where the resource is changed based on the determination of the UE 100, the eNB 200 and the UE 100 may recognize that the previous resource (Resource 2) is implicitly released.

The third embodiment may be summarized as follows.

The network apparatus (the eNB 200) according to the third embodiment is used in the mobile telecommunication system which provides the plurality of communication services. The network apparatus includes the controller which manages the plurality of resource pools provided for each communication service. The plurality of resource pools is provided in one radio frame and in one system bandwidth. The plurality of resource pools includes the primary resource pool which is first used by the radio terminal among the plurality of resource pools.

The radio terminal (the UE 100) according to the third embodiment is used in the mobile telecommunication system which provides the plurality of communication services. The radio terminal includes the controller which uses any of the plurality of resource pools provided for each communication service. The plurality of resource pools is provided in one radio frame and in one system bandwidth. The controller uses the primary resource pool first among the plurality of resource pools.

Fourth Embodiment

In the following, the fourth embodiment will be described mainly focusing on differences from the first to third embodiments.

Figure 12A:
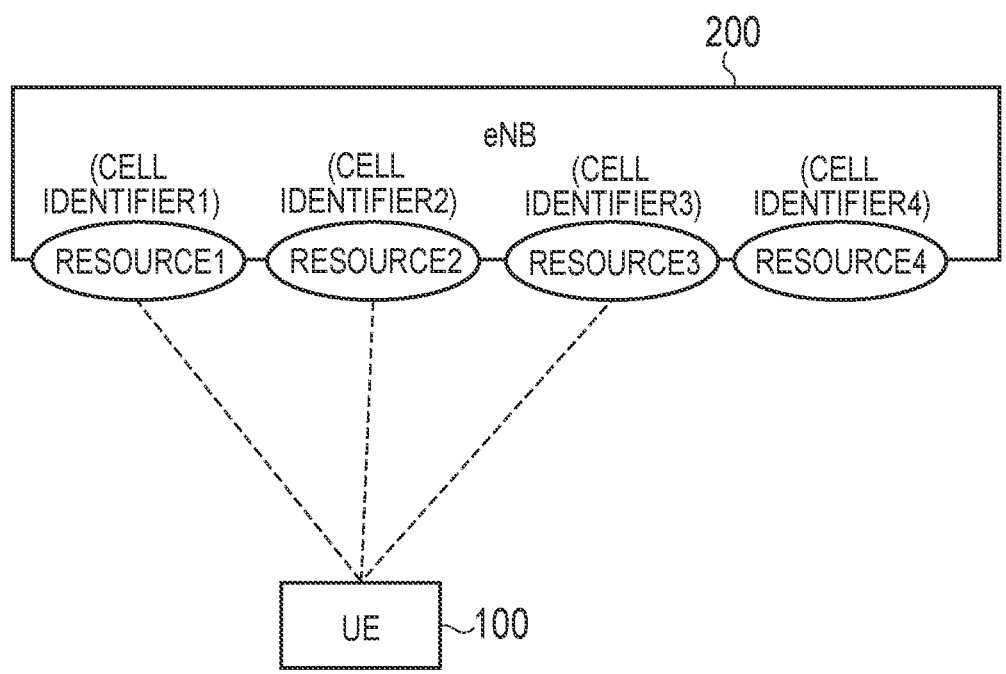
FIGS. 12A and 12B are diagrams illustrating an operation according to a fourth embodiment.
Figure 12B:
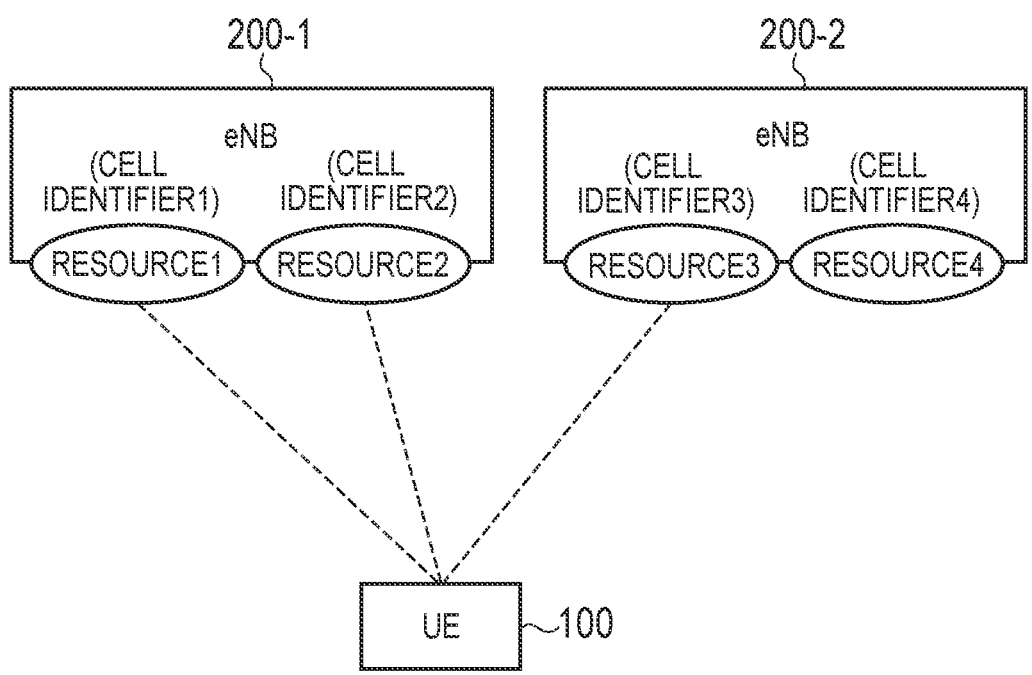

FIGS. 12A and 12B are diagrams illustrating an operation according to the fourth embodiment. As illustrated in FIGS. 12A and 12B, in the fourth embodiment, each of the plurality of resource pools (the plurality of resources) includes a cell identifier. The cell identifier is, for example, a PCI (Physical Cell Identity). The eNB 200 and the UE 100 handle each of the plurality of resource pools as one cell. The eNB 200 preferably transmits the same type of signal as a signal which is transmitted by a normal cell in each resource pool.

In FIG. 12A, the plurality of resource pools is managed by the same eNB 200. The UE 100 is connected to Resource 1 (Cell 1) and Resource 2 (Cell 2). In this case, the communication may be controlled by a similar method to carrier aggregation (CA).

In the fourth embodiment, in a case where the UE 100 using the plurality of resource pools at the same time performs handover, the eNB 200 and the UE 100 perform a handover procedure using one resource pool among the plurality of resource pools. Further, while hand over is not limited to a case where all of the plurality of resource pools are handed over, the UE 100 may hand over only some of the plurality of resource pools.

As illustrated in FIG. 12B, the plurality of resource pools may be managed by the plurality of eNBs 200. The UE 100 is connected to Resource 1 (Cell 1) and Resource 2 (Cell 2). In this case, the communication may be controlled in a similar method to dual connectivity (DC).

The eNB 200 or the UE 100 may select a resource pool having a smallest latency among the plurality of resource pools in use, as one resource pool which is used in the handover procedure. Alternatively, one resource pool used in the handover procedure may be a pre-defined resource pool (for example, the common control resource or the primary resource described above).

In the handover procedure, the UE 100 may notify the identifier (cell identifier) of each of the plurality of resource pools used by itself to the eNB 200 using the selected one resource pool. The eNB 200 performs the handover of each resource pool using the plurality of resource pools as the plurality of cells.

Alternatively, the eNB 200 may manage the identifier (cell identifier) of each of the plurality of resource pools used by the UE 100 in association with a predetermined index (for example, a UE identifier). In this case, the UE 100 may notify the predetermined index to the eNB 200 using the selected one resource pool in the handover procedure. The eNB 200 considers the plurality of resource pools corresponding to the notified predetermined index as the plurality of cells, and performs the handover of each resource pool.

The fourth embodiment may be summarized as follows.

The network apparatus (the eNB 200) according to the fourth embodiment is used in the mobile telecommunication system which provides the plurality of communication services. The network apparatus includes the controller which manages the plurality of resource pools provided for each communication service. The plurality of resource pools is provided in one radio frame and in one system bandwidth. Each of the plurality of resource pools includes the cell identifier. The controller handles each of the plurality of resource pools as one cell.

The radio terminal (the UE 100) according to the fourth embodiment is used in the mobile telecommunication system which provides the plurality of communication services. The radio terminal includes the controller which uses any of the plurality of resource pools provided for each communication service. The plurality of resource pools is provided in one radio frame and in one system bandwidth. Each of the plurality of resource pools includes the cell identifier. The controller handles each of the plurality of resource pools as one cell.

Other Embodiments

The respective embodiments described above may be individually implemented, or may be implemented by combining two or more embodiments. For example, some operations of one embodiment may be added to another embodiment, or some operations of one embodiment may be replaced with those of other embodiments.

In addition, in the respective embodiments described above, at least some of the operations described as being performed by the eNB 200 may be performed by a network apparatus other than the eNB 200.

In the respective embodiments described above, it has been assumed that the UE 100 supports the plurality of services. However, there may be a UE 100 which supports only one service.

In the respective embodiments described above, the radio terminal (the UE 100) may be a mobile phone terminal, an in-vehicle terminal, a card-type terminal, or other types of terminals.

(Note)
(Note A1)

A network apparatus which is used in a mobile telecommunication system providing a plurality of communication services, including:

a controller which manages a plurality of resource pools provided for each communication service, wherein the plurality of resource pools is provided in one radio frame and in one system bandwidth, and wherein the controller transmits resource map information indicating a layout pattern of the plurality of resource pools to a radio terminal.

(Note A2)

The network apparatus according to Note A1, wherein the controller transmits the resource map information using a specific resource pool, and wherein a base TTI (Transmission Time Interval) is applied to the specific resource pool.

(Note A3)

The network apparatus according to Note A1, wherein the resource map information includes information indicating whether a resource in the resource pool is allocated by the network apparatus or the radio terminal.

(Note B1)

A network apparatus which is used in a mobile telecommunication system providing a plurality of communication services, including:

a controller which manages a plurality of resource pools provided for each communication service and a use condition of each of the plurality of resource pools, wherein the plurality of resource pools is provided in one radio frame and in one system bandwidth, and wherein the use condition is a condition to be satisfied by a radio terminal to use a corresponding resource pool.

(Note B2)

The network apparatus according to Note B1, wherein the controller is configured to transmit information indicating the use condition to the radio terminal, and receive information from the radio terminal which indicates a determination result of whether the use condition is satisfied.

(Note B3)

The network apparatus according to Note B1, wherein the controller determines whether the radio terminal satisfies the use condition, and notifies information indicating a determination result to the radio terminal.

(Note B4)

The network apparatus according to Note B1, wherein the use condition includes at least one of a threshold which is compared to a radio parameter, a threshold which is compared to a random number, a class or a category of the radio terminal, a range of an identifier of the radio terminal, a type of an application which is performed by the radio terminal, and a type of a protocol which is performed by the radio terminal.

(Note C1)

A network apparatus which is used in a mobile telecommunication system providing a plurality of communication services, including:

a controller which manages a plurality of resource pools provided for each communication service, wherein the plurality of resource pools is provided in one radio frame and in one system bandwidth, and wherein the plurality of resource pools includes a primary resource pool which is first used by the radio terminal among the plurality of resource pools.

(Note C2)

The network apparatus according to Note C1, wherein the controller transmits information indicating the primary resource pool and/or information indicating a priority of the plurality of resource pools to the radio terminal.

(Note C3)

The network apparatus according to Note C1, wherein the controller transmits information to the radio terminal which causes the radio terminal to use a resource pool other than the primary resource pool, after the radio terminal starts to use the primary resource pool.

(Note D1)

A radio terminal which is used in a mobile telecommunication system providing a plurality of communication services, including:

a controller which uses any of a plurality of resource pools provided for each communication service, wherein the plurality of resource pools is provided in one radio frame and in one system bandwidth, wherein each of the plurality of resource pools includes a cell identifier, and wherein the controller handles each of the plurality of resource pools as one cell.

(Note D2)

The radio terminal according to Note D1, wherein, in a case where the radio terminal using the plurality of resource pools at the same time carries out handover, the controller performs a handover procedure using one resource pool among the plurality of resource pools.

(Note D3)

A network apparatus which is used in a mobile telecommunication system providing a plurality of communication services, including:

a controller which manages a plurality of resource pools provided for each communication service, wherein the plurality of resource pools is provided in one radio frame and in one system bandwidth, wherein each of the plurality of resource pools includes a cell identifier, and wherein the controller handles each of the plurality of resource pools as one cell.

(Note D4)

The network apparatus according to Note D3, wherein, in a case where a radio terminal using the plurality of resource pools at the same time carries out handover, the controller performs a handover procedure using one resource pool among the plurality of resource pools.

The invention claimed is:

1. A user equipment comprising:
a processor and a memory coupled to the processor, the processor configured to:
receive from a base station, for each bandwidth part of a plurality of bandwidth parts provided in a bandwidth of one carrier, information indicating a frequency location of the bandwidth part and information indicating a subcarrier spacing applied to the corresponding bandwidth part; and
use one of the plurality of bandwidth parts on the basis of the information received from the base station, wherein
the plurality of bandwidth parts includes a special bandwidth part which the user equipment should use initially, and
the processor is further configured to receive, from the base station, broadcast information including information on the special bandwidth part.

2. A base station comprising:
a processor and a memory coupled to the processor, the processor configured to:
transmit to a user equipment, for each bandwidth part of a plurality of bandwidth parts provided in a bandwidth of one carrier, information indicating a frequency location of the bandwidth part and information indicating a subcarrier spacing applied to the corresponding bandwidth part, wherein the plurality of bandwidth parts includes a special bandwidth part which the user equipment should use initially; and
transmit to the user equipment, broadcast information including information on the special bandwidth part.

3. A method used in a user equipment, the method comprising:
receiving from a base station, for each bandwidth part of a plurality of bandwidth parts provided in a bandwidth of one carrier, information indicating a frequency location of the bandwidth part and information indicating a subcarrier spacing applied to the corresponding bandwidth part;
using one of the plurality of bandwidth parts on the basis of the information received from the base station, wherein the plurality of bandwidth parts includes a special bandwidth part which the user equipment should use initially; and receiving from the base station, broadcast information including information on the special bandwidth part.

* * * * *